United States Patent
Han et al.

(10) Patent No.: US 11,507,825 B2
(45) Date of Patent: Nov. 22, 2022

(54) AI APPARATUS AND METHOD FOR MANAGING OPERATION OF ARTIFICIAL INTELLIGENCE SYSTEM

(71) Applicant: LG ELECTRONICS INC., Seoul (KR)

(72) Inventors: Jongwoo Han, Seoul (KR); Heeyeon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 635 days.

(21) Appl. No.: 16/488,501

(22) PCT Filed: Jun. 7, 2019

(86) PCT No.: PCT/KR2019/006896
§ 371 (c)(1),
(2) Date: Aug. 23, 2019

(87) PCT Pub. No.: WO2020/246647
PCT Pub. Date: Dec. 10, 2020

(65) Prior Publication Data
US 2021/0174187 A1 Jun. 10, 2021

(51) Int. Cl.
*G10L 15/22* (2006.01)
*G06N 3/08* (2006.01)
(Continued)

(52) U.S. Cl.
CPC ............... *G06N 3/08* (2013.01); *G10L 15/063* (2013.01); *G10L 15/22* (2013.01); *G10L 25/51* (2013.01);
(Continued)

(58) Field of Classification Search
CPC ......... G06N 3/08; G10L 15/063; G10L 15/22; G10L 25/51; G10L 2015/223
(Continued)

(56) References Cited

U.S. PATENT DOCUMENTS 9,559,890 B2 1/2017 Gavade et al.
2018/0144255 A1* 5/2018 Shams .................... G10L 25/66
(Continued)

FOREIGN PATENT DOCUMENTS

KR 10-1193234 B1 10/2012
KR 10-2018-0125780 A 11/2018
WO WO-2017133165 A1 * 8/2017

OTHER PUBLICATIONS

W. J. Kim, G. W. Kim, Y. S. Lee and M. H. Yun, "Deriving the relationship between user satisfaction on engine sounds and affective variable sets based on classification algorithms," 2014 IEEE International Conference on Industrial Engineering and Engineering Management, 2014, pp. 1310-1313, doi: 10.11 (Year: 2014).*

(Continued)

*Primary Examiner* — Bharatkumar S Shah
(74) *Attorney, Agent, or Firm* — Birch, Stewart, Kolasch & Birch, LLP

(57) ABSTRACT

Provided is an artificial intelligence (AI) apparatus for managing an operation of an artificial intelligence (AI) system. The AI apparatus includes: a communication unit that receives state information from at least one member AI apparatus included in the AI system, respectively; a memory that stores apparatus information on the at least one member AI apparatus, respectively; and a processor that: upon acquiring a control command of a user, determines a target member AI apparatus to perform the control command; determines whether the target member AI apparatus is capable of performing the control command or not; transmits the control command to the target member AI apparatus if the target member AI apparatus is capable of performing the control command, and outputs a response indicating that the target member AI apparatus is not capable of performing the control command if the target member AI apparatus is not capable of performing the control command.

10 Claims, 13 Drawing Sheets

(51) Int. Cl.
    *G10L 15/06* (2013.01)
    *G10L 25/51* (2013.01)
    *G10L 15/18* (2013.01)
(52) U.S. Cl.
    CPC .... *G10L 15/1815* (2013.01); *G10L 2015/223* (2013.01)
(58) Field of Classification Search
    USPC .......................................................... 706/25
    See application file for complete search history.

(56) References Cited

U.S. PATENT DOCUMENTS

| | | | |
|---|---|---|---|
| 2019/0042884 A1 | 2/2019 | Guim Bernat et al. | |
| 2019/0066674 A1* | 2/2019 | Jaygarl | G06F 3/167 |
| 2020/0034112 A1* | 1/2020 | Woo | G06N 20/00 |
| 2021/0119944 A1* | 4/2021 | Kim | G06F 40/35 |
| 2021/0149627 A1* | 5/2021 | Jang | H04L 51/18 |

OTHER PUBLICATIONS

W. J. Kim, G. W. Kim, Y. S. Lee and M. H. Yun, "Deriving the relationship between user satisfaction on engine sounds and affective variable sets based on classification algorithms," 2014 [EEE International Conference on Industrial Engineering and Engineering Management, 2014, pp. 1310-1313, doi: 10.11 (Year: 2014).*

E. P. Blasch, U. Majumder, T. Rovito and A. K. Raz, "Artificial Intelligence in Use by Multimodal Fusion," 2019 22th International Conference on Information Fusion (Fusion), 2019, pp. 1-8. (Year: 2019).*

* cited by examiner

FIG. 12

| TRAINING DATA | AMBIENT NOISE LEVEL (dB) | DISTANCE TO USER (m) | SPEAKER OUTPUT LEVEL (dB) | USER SATISFACTION |
|---|---|---|---|---|
| TRAINING DATA 1 | 10 | 10 | 30 | 80 |
| TRAINING DATA 2 | 5 | 5 | 30 | 100 |
| TRAINING DATA 3 | 20 | 5 | 30 | 75 |
| TRAINING DATA 4 | 15 | 15 | 30 | 50 |
| ... | ... | ... | ... | ... |

AI APPARATUS AND METHOD FOR MANAGING OPERATION OF ARTIFICIAL INTELLIGENCE SYSTEM

CROSS REFERENCE TO RELATED APPLICATIONS

This application is the National Phase of PCT International Application No. PCT/KR2019/006896, filed on Jun. 7, 2019, which is hereby expressly incorporated by reference into the present application.

BACKGROUND

1. Field

The present invention relates to an artificial intelligence (AI) apparatus and a method for managing an operation of an artificial intelligence (AI) system. Specifically, the present invention relates to an AI apparatus and a method for recognizing states of AI apparatuses constituting a single AI system and managing an operation of the AI system based on the states of the AI apparatuses.

2. Related Art

Recently, devices equipped with an artificial intelligence (AI) function are increasing. As a result, there are a growing number of users having various AI apparatuses in their home. However, current AI apparatuses only operate separately from each other and do not provide functions that operate organically with each other.

Further, there are many situations in which the AI apparatus is not suitable for interacting with the user, such as when the AI apparatus is in communication with an AI server, when a network state of the AI apparatus is bad, when the AI apparatus is turned off, or when the AI apparatus is updating software. However, conventionally, in such busy or unavailable state, a response of the AI apparatus to the user is impossible or delayed, so that the interaction with the user was ignored or delayed.

Therefore, there is a need for a method in which a plurality of AI apparatuses operate organically with each other, and another AI apparatus operates or provides feedback alternatively when an AI apparatus, which is a subject of the interaction with the user or control of the user, is unavailable.

SUMMARY

A purpose of the present invention is to provide an AI apparatus and a method for managing an operation of an AI system via alternative processing when a specific AI apparatus constituting a single AI system is not capable of performing a control command of a user.

In addition, another purpose of the present invention is to provide an AI apparatus and a method for outputting a response with high user satisfaction using a plurality of AI apparatuses.

An embodiment of the present invention provides an AI apparatus and a method that collect state information from at least one member AI apparatus constituting a single AI system, respectively, determine a target member AI apparatus upon acquiring a control command of a user, determine whether the target member AI apparatus is capable of performing the control command or not based on the collected state information, and outputting a response indicating that the target member AI apparatus is not capable of performing the control command when the target member AI apparatus is not capable of performing the control command.

Further, an embodiment of the present invention provides an AI apparatus and a method that determine an alternative AI apparatus for performing a control command of the user alternatively when a target AI apparatus is not capable of performing the control command of the user and ask the user whether to transmit the control command to the alternative AI apparatus to perform an alternative operation.

Further, an embodiment of the present invention provides an AI apparatus and a method that, when a target AI apparatus is not capable of performing a control command of a user, ask the user whether to retransmit the control command of the user at a time when the corresponding target AI apparatus is capable of performing the control command of the user to perform an alternative operation.

Further, an embodiment of the present invention provides an AI apparatus and a method that calculate user satisfaction when outputting a sound based on an ambient noise level, a distance to a user, a speaker output level at each AI apparatus, and output a response from an AI apparatus with the highest user satisfaction.

According to various embodiments of the present invention, even though a specific AI apparatus in the AI system composed of the plurality of AI apparatuses is not capable of performing the control command of the user, an operation reliability of the AI system may be guaranteed and the user satisfaction may be increased by notifying the user that the specific AI apparatus is not capable of performing the control command of the user, allowing the alternative AI apparatus to perform the control alternatively, or retransmitting the control command to the target AI apparatus.

Further, according to various embodiments of the present invention, user satisfaction for interactions between AI apparatuses may be increased by outputting a response from an AI apparatus with the highest user satisfaction among a plurality of AI apparatuses when outputting a sound.

BRIEF DESCRIPTION OF DRAWINGS

FIG. 12 is a table illustrating an example of training data used in learning of a satisfaction calculation model according to an embodiment of the present invention.

DETAILED DESCRIPTIONS

Figure 1:
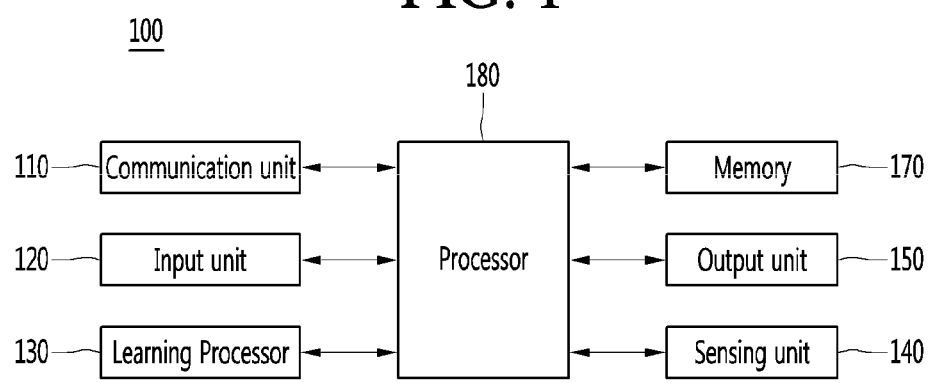
FIG. 1 is a block diagram illustrating an AI apparatus according to an embodiment of the present invention.

Hereinafter, embodiments of the present invention are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present invention is not limited thereto. It should be understood that all of variations, equivalents or substitutes contained in the concept and technical scope of the present invention are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present invention.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication unit 110, an input unit 120, a learning processor 130, a sensing unit 140, an output unit 150, a memory 170, and a processor 180.

The communication unit 110 may transmit and receive data to and from external devices such as other 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a training data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing unit 140 may acquire at least one of internal information about the AI apparatus 100, ambient environment information about the AI apparatus 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI apparatus 100. For example, the memory 170 may store input data acquired by the input unit 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
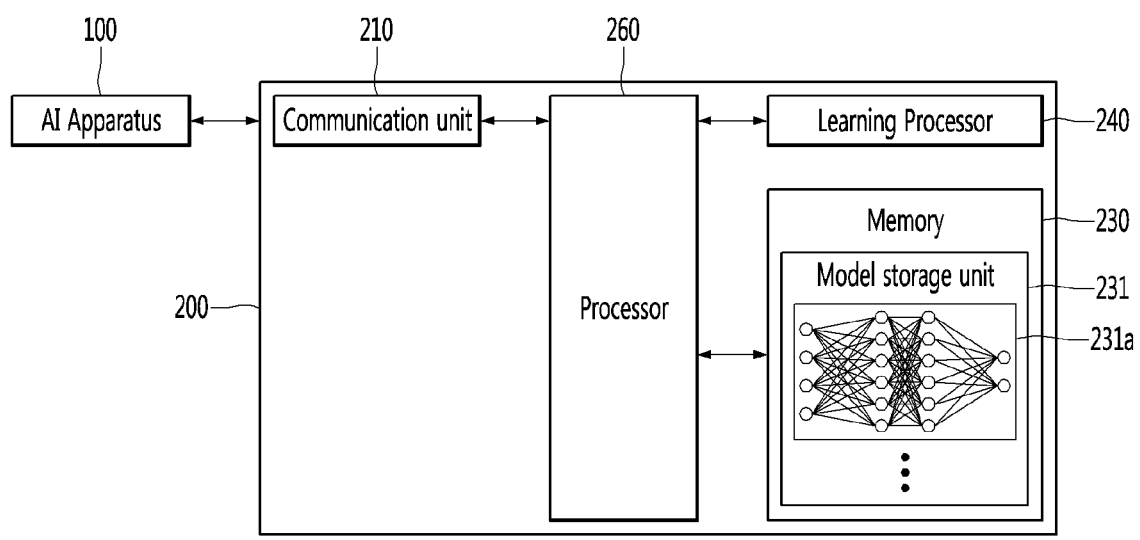
FIG. 2 is a block diagram illustrating an AI server according to an embodiment of the present invention.

FIG. 2 is a block diagram illustrating an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI apparatus 100, and may perform at least part of the AI processing together.

The AI server 200 may include a communication unit 210, a memory 230, a learning processor 240, a processor 260, and the like.

The communication unit 210 can transmit and receive data to and from an external device such as the AI apparatus 100.

The memory 230 may include a model storage unit 231. The model storage unit 231 may store a learning or learned model (or an artificial neural network 231a) through the learning processor 240.

The learning processor 240 may learn the artificial neural network 231a by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
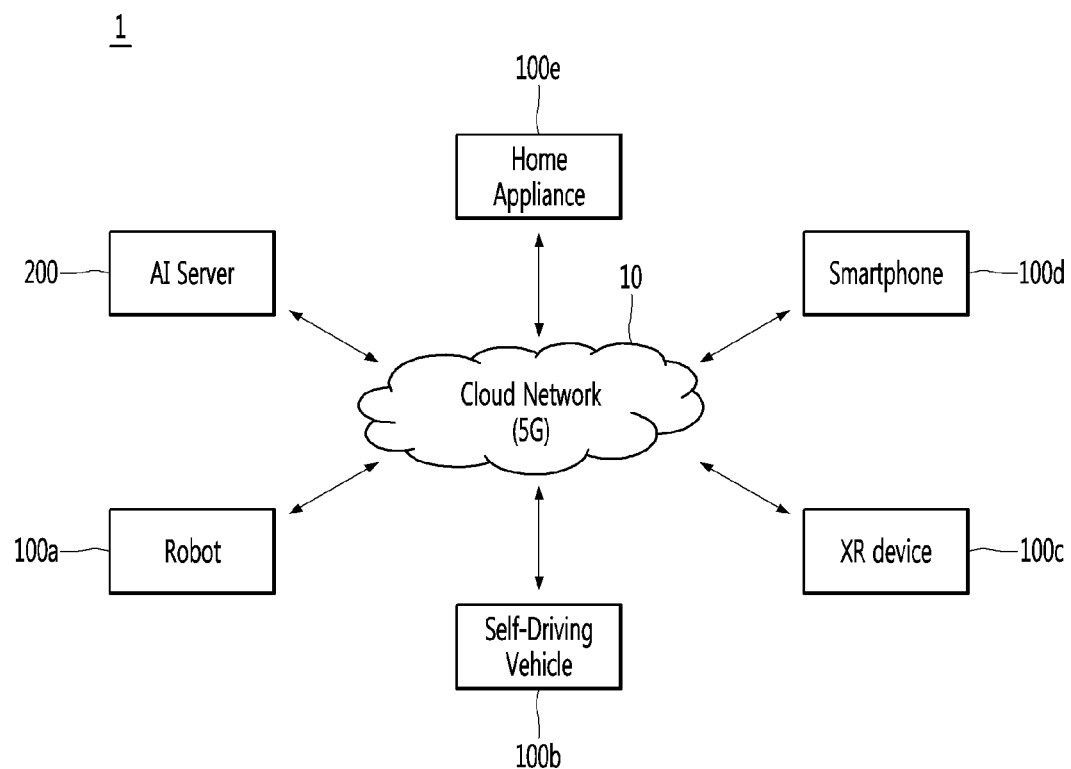
FIG. 3 is a view illustrating an AI system according to an embodiment of the present invention.

FIG. 3 is a view illustrating an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the apparatuses 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

At this time, the AI server 200 may learn the artificial neural network according to the machine learning algorithm instead of the AI apparatuses 100a to 100e, and may directly store the learning model or transmit the learning model to the AI apparatuses 100a to 100e.

At this time, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external device to determine the travel route and the travel plan, and may control the driving unit such that the robot 100a travels along the determined travel route and travel plan.

The map data may include object identification information about various objects arranged in the space in which the robot 100*a* moves. For example, the map data may include object identification information about fixed objects such as walls and doors and movable objects such as pollen and desks. The object identification information may include a name, a type, a distance, and a position.

In addition, the robot 100*a* may perform the operation or travel by controlling the driving unit based on the control/interaction of the user. At this time, the robot 100*a* may acquire the intention information of the interaction due to the user's operation or speech utterance, and may determine the response based on the acquired intention information, and may perform the operation.

<AI+Self-Driving>

The self-driving vehicle 100*b*, to which the AI technology is applied, may be implemented as a mobile robot, a vehicle, an unmanned flying vehicle, or the like.

The self-driving vehicle 100*b* may include a self-driving control module for controlling a self-driving function, and the self-driving control module may refer to a software module or a chip implementing the software module by hardware. The self-driving control module may be included in the self-driving vehicle 100*b* as a component thereof, but may be implemented with separate hardware and connected to the outside of the self-driving vehicle 100*b*.

The self-driving vehicle 100*b* may acquire state information about the self-driving vehicle 100*b* by using sensor information acquired from various kinds of sensors, may detect (recognize) surrounding environment and objects, may generate map data, may determine the route and the travel plan, or may determine the operation.

Like the robot 100*a*, the self-driving vehicle 100*b* may use the sensor information acquired from at least one sensor among the lidar, the radar, and the camera so as to determine the travel route and the travel plan.

In particular, the self-driving vehicle 100*b* may recognize the environment or objects for an area covered by a field of view or an area over a certain distance by receiving the sensor information from external devices, or may receive directly recognized information from the external devices.

The self-driving vehicle 100*b* may perform the above-described operations by using the learning model composed of at least one artificial neural network. For example, the self-driving vehicle 100*b* may recognize the surrounding environment and the objects by using the learning model, and may determine the traveling movement line by using the recognized surrounding information or object information. The learning model may be learned directly from the self-driving vehicle 100*a* or may be learned from an external device such as the AI server 200.

At this time, the self-driving vehicle 100*b* may perform the operation by generating the result by directly using the learning model, but the sensor information may be transmitted to the external device such as the AI server 200 and the generated result may be received to perform the operation.

The self-driving vehicle 100*b* may use at least one of the map data, the object information detected from the sensor information, or the object information acquired from the external device to determine the travel route and the travel plan, and may control the driving unit such that the self-driving vehicle 100*b* travels along the determined travel route and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* may perform the operation or travel by controlling the driving unit based on the control/interaction of the user. At this time, the self-driving vehicle 100*b* may acquire the intention information of the interaction due to the user's operation or speech utterance, and may determine the response based on the acquired intention information, and may perform the operation.

<AI+XR>

The XR device 100*c*, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* may analyzes three-dimensional point cloud data or image data acquired from various sensors or the external devices, generate position data and attribute data for the three-dimensional points, acquire information about the surrounding space or the real object, and render to output the XR object to be output. For example, the XR device 100*c* may output an XR object including the additional information about the recognized object in correspondence to the recognized object.

The XR device 100*c* may perform the above-described operations by using the learning model composed of at least one artificial neural network. For example, the XR device 100*c* may recognize the real object from the three-dimensional point cloud data or the image data by using the learning model, and may provide information corresponding to the recognized real object. The learning model may be directly learned from the XR device 100*c*, or may be learned from the external device such as the AI server 200.

At this time, the XR device 100*c* may perform the operation by generating the result by directly using the learning model, but the sensor information may be transmitted to the external device such as the AI server 200 and the generated result may be received to perform the operation.

<AI+Robot+Self-Driving>

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given movement line without the user's control or moves for itself by determining the movement line by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
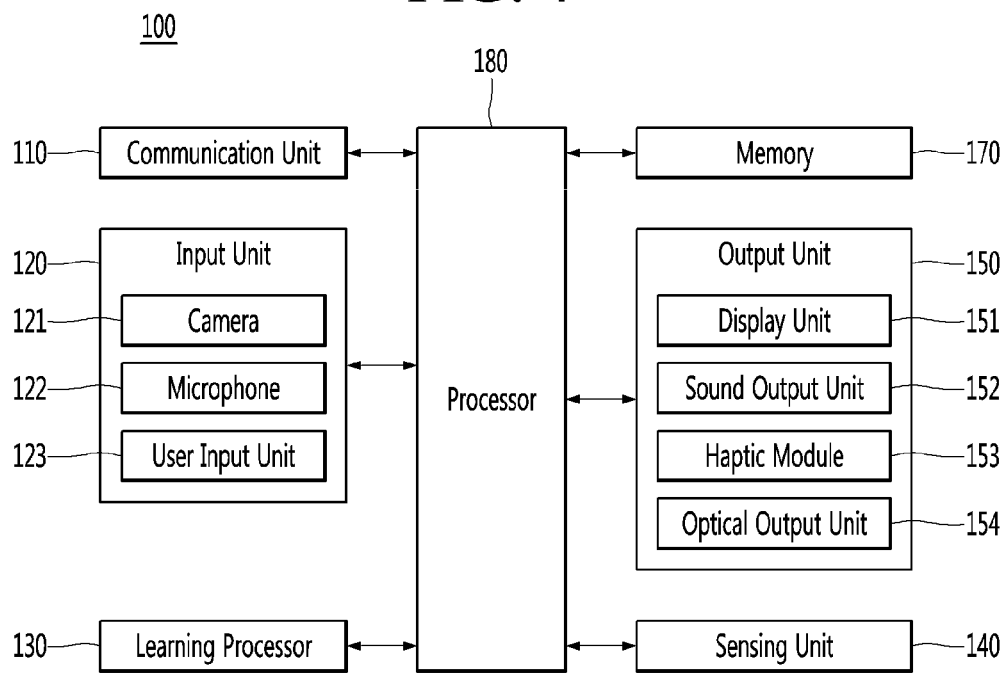
FIG. 4 is a block diagram illustrating an AI apparatus according to an embodiment of the present invention.

FIG. 4 is a block diagram illustrating an AI apparatus 100 according to an embodiment of the present invention.

The redundant repeat of FIG. 1 will be omitted below.

Referring to FIG. 4, the input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the AI apparatus 100 to correspond to the inputted information.

The user input unit 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

The output unit 150 may include at least one of a display unit 151, a sound output module 152, a haptic module 153, or an optical output module 154.

The display unit 151 may display (output) information processed in the AI apparatus 100. For example, the display unit 151 may display execution screen information of an application program running on the AI apparatus 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the AI apparatus 100 and a user, and an output interface between the AI apparatus 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

Figure 5:
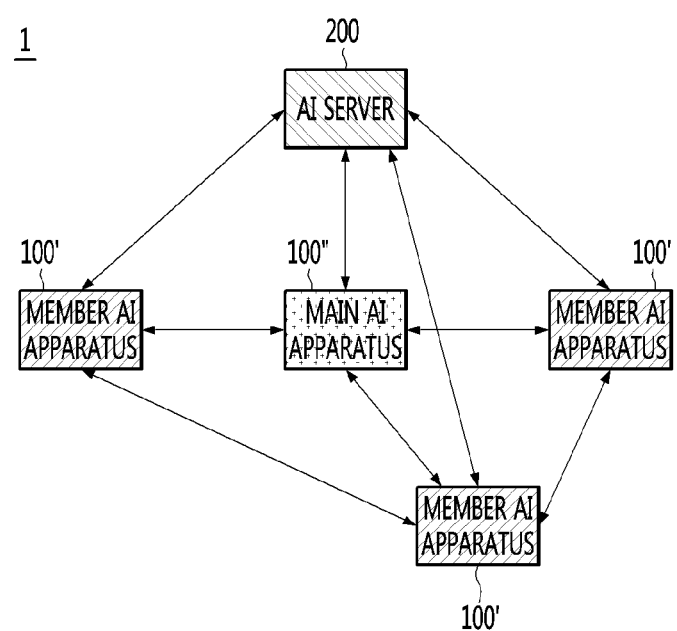
FIG. 5 is a view illustrating an AI system according to an embodiment of the present invention.

FIG. 5 is a view illustrating the AI system 1 according to an embodiment of the present invention.

Referring to FIG. 5, the AI system 1 according to an embodiment of the present invention may include at least one member AI apparatuses 100', the AI server 200, and a main AI apparatus 100".

The member AI apparatus 100' and the main AI apparatus 100" may be collectively referred to as the AI apparatus 100.

The main AI apparatus 100" refers to a main agent that provides integrated functions related to the member AI apparatuses 100' included in the AI system 1.

That is, one of the plurality of AI apparatuses 100 may function as the main AI apparatus 100" serving as the main agent.

For example, the main AI apparatus 100" may be implemented as an AI speaker, an AI TV, a smart phone, or the like.

Hereinafter, the main AI apparatus 100" may be referred to as the main agent, the AI apparatus 100 serving as the main agent, or the like. Further, devices other than the main AI apparatus 100" among the AI apparatuses 100 may be referred to as sub AI apparatuses or the member AI apparatuses 100'.

At least one of the member AI apparatus 100', the AI server 200, and the main AI apparatus 100" may communicate with each other using a wired or wireless communication technology.

Here, each of the apparatuses 100', 100", and 200 may communicate with each other via a base station, a router, or the like, but may directly communicate with each other using a short-range communication technique or the like.

For example, each of the apparatuses 100', 100", 200 may communicate with each other via the base station or directly using 5G (5th generation) communication.

The main AI apparatus 100" may store apparatus information about the member AI apparatuses 100' included in the same AI system 1 or the same group.

The apparatus information may include a type, identification information, model information, or the like of each of the member AI apparatuses 100'.

Further, the main AI apparatus 100" may store device location information for the member AI apparatuses 100' included in the same AI system 1 or the same group or relative location information between the member AI apparatuses 100'.

The device location information or relative location information for the member AI apparatuses 100' may be used to group the AI apparatuses 100.

Here, the group may mean the AI system 1 itself or a smaller unit than the AI system 1 that distinguishes the AI apparatuses 100 in the AI system 1.

For example, the main AI apparatus 100" may divide the at least one AI apparatuses 100 constituting the same AI system 1 into at least one group based on the relative location information between the devices. More specifically, the main AI apparatus 100" may group the AI apparatuses 100 located in the same space into one group.

Alternatively, the main AI apparatus 100" may divide the at least one AI apparatuses 100 constituting the AI system 1 into the at least one group by a user input.

FIG. 5 illustrates the AI system 1 having the main AI apparatus 100" configured to function as the main agent of the member AI apparatus 100'. However, the present invention is not limited thereto, and each of the AI apparatuses 100 may be configured to perform all functions without being divided into the main AI apparatus 100" or the member AI apparatus 100'.

Figure 6:
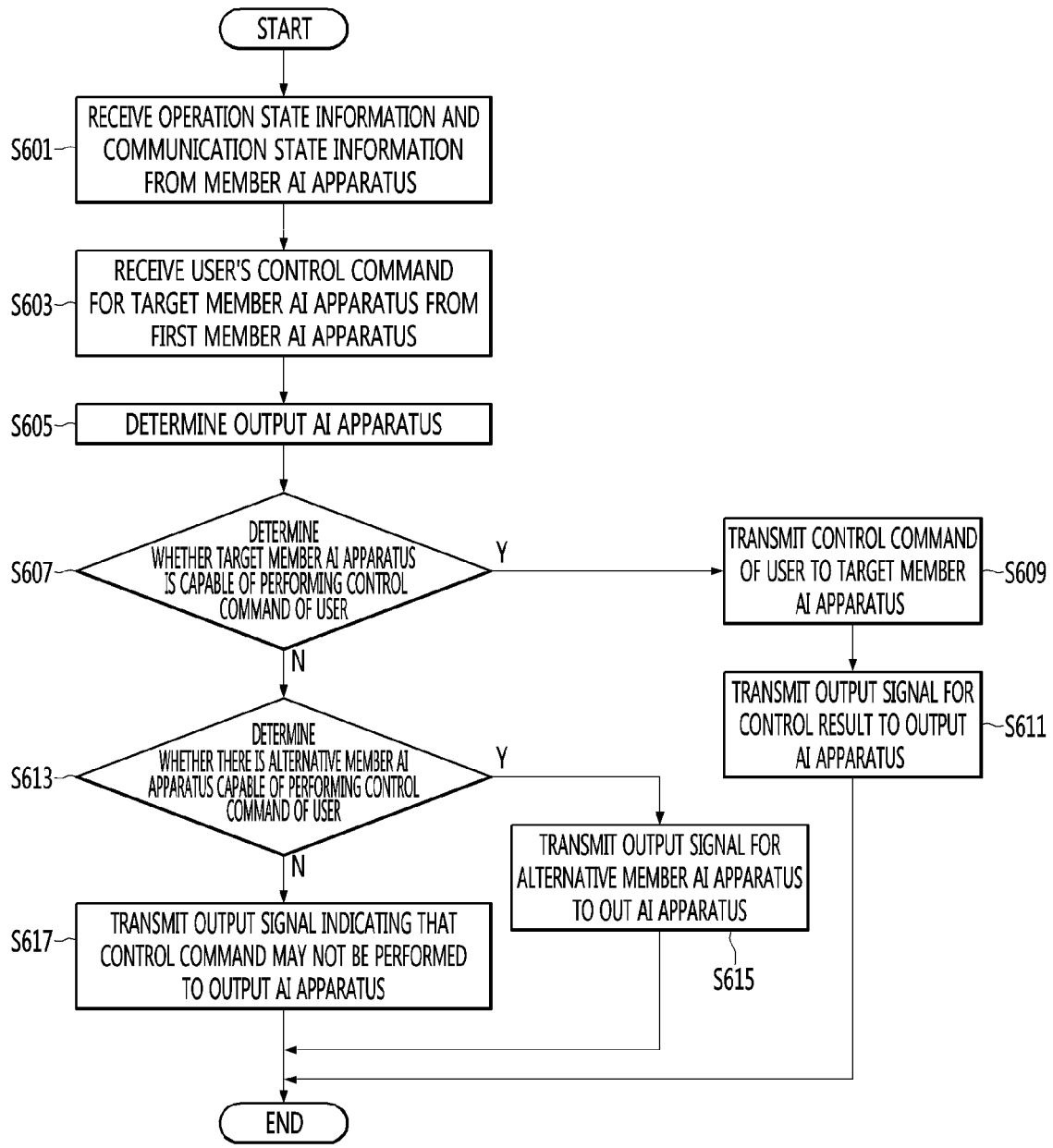
FIG. 6 is a flowchart illustrating a method for managing an operation of an AI system according to one embodiment of the present invention.

FIG. 6 is a flowchart illustrating a method for managing an operation of an AI system according to one embodiment of the present invention.

Referring to FIG. 6, the processor 180 of the main AI apparatus 100" receives operation state information and communication state information from the at least one member AI apparatus 100' of the same group via the communication unit 110 (S601).

The operation state information indicates an operation state of the corresponding member AI apparatus 100'. The operation state information may include whether the device 100' operates normally, whether the device 100' is failed, power state information, whether software of the device 100' is updated, operation information, or the like.

For example, operation state information of a robot cleaner may include content indicating that a power is turned on, the robot cleaner is in normal operation, and the robot cleaner is cleaning a living room in a quick cleaning mode.

The communication state information indicates a communication state of the corresponding member AI apparatus 100'. Further, the communication state information may include communication availability, communication quality/stability state, whether the robot cleaner is in communication with the AI server 200, data transmission/reception content, and the like.

The data transmission/reception content may include log transmission/reception, software data transmission/reception, and firmware data transmission/reception content, or the like.

Further, the main AI apparatus 100" may receive logs respectively from the at least one member AI apparatus 100'.

The log may include a record of the operation state, a result of the operation, and the like.

Accordingly, the main AI apparatus 100" may recognize a state of each of the member AI apparatuses 100' included in the same group.

Then, the processor 180 of the main AI apparatus 100" receives a user's control command for a target member AI apparatus from a first member AI apparatus via the communication unit 110 (S603).

Usually, the target member AI apparatus will often be different from the first member AI apparatus. However, the target member AI apparatus may be the same as the first member AI apparatus.

Here, the target member AI apparatus may be determined based on at least one of an utterance voice of the user, intention information obtained from the control command of the user, or the apparatus information of each AI apparatus 100.

That is, when a target device is specified in the control command, the main AI apparatus 100" may determine a corresponding member AI apparatus as the target member AI apparatus.

Alternatively, when the control command includes content to perform a specific operation even when the target device is not specified, the main AI apparatus 100" may specify a device capable of performing the corresponding operation in view of the apparatus information of the member AI apparatuses 100' and may determine a corresponding member AI apparatus as the target member AI apparatus.

When the first member AI apparatus acquires a user's control command for itself and the first member AI apparatus is in a state capable of executing the user's control command by itself, the first member AI apparatus may directly provide a response of the user's control command without transmitting the acquired user's control command to the main AI apparatus.

However, even though the first member AI apparatus acquires the user's control command for itself, when the first member AI apparatus is in a state in which the first member AI apparatus is not able to execute the corresponding control command (e.g., when the user requests another washing operation to the washing machine while the washing machine is running), the first member AI apparatus may transmit acquired the control command of the user to the main AI apparatus.

Then, the processor 180 of the main AI apparatus 100" determines an output AI apparatus (S605).

The processor 180 of the main AI apparatus 100" may determine the output AI apparatus among the main AI apparatus 100" and the member AI apparatuses 100'. That is, the main AI apparatus 100" may also be determined as the output AI apparatus.

Furthermore, a terminal such as a user's smartphone or the like may be determined as the output AI apparatus.

Here, the processor 180 of the main AI apparatus 100" may determine the output AI apparatus to be the first AI apparatus that has acquired the control command of the user.

Here, the processor 180 of the main AI apparatus 100" may determine the output AI apparatus to be a member AI apparatus that executes the control command of the user. The AI apparatus that executes the user's control command may include not only the target member AI apparatus but also an alternate member AI apparatus to be described below.

Here, when there is a preferred device set by the user, the processor 180 of the main AI apparatus 100" may determine the preferred device set by the user to be the output AI apparatus.

Here, the processor 180 of the main AI apparatus 100" may use an output device decision model learned by a machine learning algorithm or a deep learning algorithm to determine an AI apparatus 100 that may provide an output of the highest satisfaction to the user to determine the output AI apparatus.

The output device decision model is learned using training data. Each training data may include an ambient noise level, a distance to the user, an output level of the speaker, and the like as an input feature and may include user satisfaction as label data.

Then, the processor 180 of the main AI apparatus 100" determines whether the target member AI apparatus may perform the control command of the user (S607).

Here, the processor 180 of the main AI apparatus 100" may determine whether the main AI apparatus 100" may communicate with the target member AI apparatus, whether the power of the target member AI apparatus is turned on, whether the target member AI apparatus may perform the control command of the user, or the like.

Specifically, the processor 180 of the main AI apparatus 100" may determine whether the target member AI apparatus is capable of performing the control command of the user based on at least one of a power supply state, an operating state, a software update state, a data transmission state, or a network state of the target member AI apparatus.

Here, the processor 180 of the main AI apparatus 100" may determine whether the target member AI apparatus is capable of performing the control command of the user by determining whether the target member AI apparatus has a function of performing the control command of the user, determining whether the target member AI apparatus has the function of performing the control command of the user but is occupied by another operation, or the like.

When it is determined in S607 that the target member AI apparatus may perform the control command of the user, the processor 180 of the main AI apparatus 100" transmits the control command of the user to the target member AI apparatus via the communication unit 110 (S609).

When the target member AI apparatus is capable of performing the control command of the user, the processor 180 may transmit the control command of the user to the target member AI apparatus, so that the target member AI apparatus may process the control command of the user directly.

Here, when the target member AI apparatus is different from the first member AI apparatus and is capable of performing the user's control command, a case in which the user inputs the control command for the target member AI apparatus via the first member AI apparatus in a state far from the target member AI apparatus may be considered.

Then, the processor 180 of the main AI apparatus 100" transmits, via the communication unit 110, an output signal for a result of performing the control command to the output AI apparatus (S611).

The main AI apparatus 100" may transmit the output signal for the result of performing the control command to the output AI apparatus such that the output AI apparatus may output the result of performing the control command. Further, the output AI apparatus may output the result of performing the user's control command based on the received output signal.

This is because, although the target member AI apparatus is able to perform the user's control command, since the control command of the user is acquired via the first member AI apparatus, another AI apparatus other than the target member AI apparatus may be suitable for the output to the user.

When it is determined in S607 that the target member AI apparatus is not capable of performing the control command of the user, the processor 180 of the main AI apparatus 100" determines whether there is the alternative member AI apparatus capable of performing the control command of the user (S613).

For example, when the user inputs a control command for washing, but the washing machine is not suitable for performing the control command of the user such as cases in which the washing machine is turned off, the washing machine is updating software or firmware, or the washing machine is already running, the main AI apparatus 100" may determine whether another washing machine, a clothes managing device, or the like exists as an alternative member AI apparatus that may performing washing among member AI apparatuses 100' belonging to the same group.

When it is determined in S613 that the alternative member AI apparatus exists, the processor 180 of the main AI apparatus 100" transmits an output signal for the alternative member AI apparatus to the output AI apparatus (S615).

The main AI apparatus 100" may transmit the output signal for the alternative member AI apparatus to the output AI apparatus such that the output AI apparatus may output content indicating that there is the alternative member AI apparatus. Further, the output AI apparatus may output information about the alternate member AI apparatus based on the received output signal.

Here, the output AI apparatus may output a reason why the target member AI apparatus for the control command of the user is not able to perform the command currently, what is the alternative member AI apparatus that is capable of performing the control command of the user instead of the target member AI apparatus, and whether to allow the alternative member AI apparatus to perform the control command of the user.

Thereafter, when the user responds to allow the alternative member AI apparatus to perform the control command alternatively, the alternate member AI apparatus may be allowed to perform the control command of the user. On the other hand, when the user responds to not allow the alternative member AI apparatus to perform the control command alternatively or when the user did not respond, the control command of the user may not be performed.

When it is determined in S613 that the alternative member AI apparatus does not exist, the processor 180 of the main AI apparatus 100" transmits an output signal indicating that the control command may not be executed to the output AI apparatus (S617).

The main AI apparatus 100" may transmit the output signal outputting a response indicating that the control command may not be executed to the output AI apparatus such that the output AI apparatus may output a response indicating that the target member AI apparatus is not capable of performing the control command of the user. Then, the output AI apparatus may output content indicating that the control command of the user may not be able to be performed based on the received output signal.

Here, the output AI apparatus may output a notification, based on the received output signal, indicating that why the target member AI apparatus for the control command of the user is not able to perform the current command and the control command of the user is not able to be performed currently.

Here, the output AI apparatus may output a notification that there is no alternative member AI apparatus that may perform the control command of the user alternatively.

Figure 7:
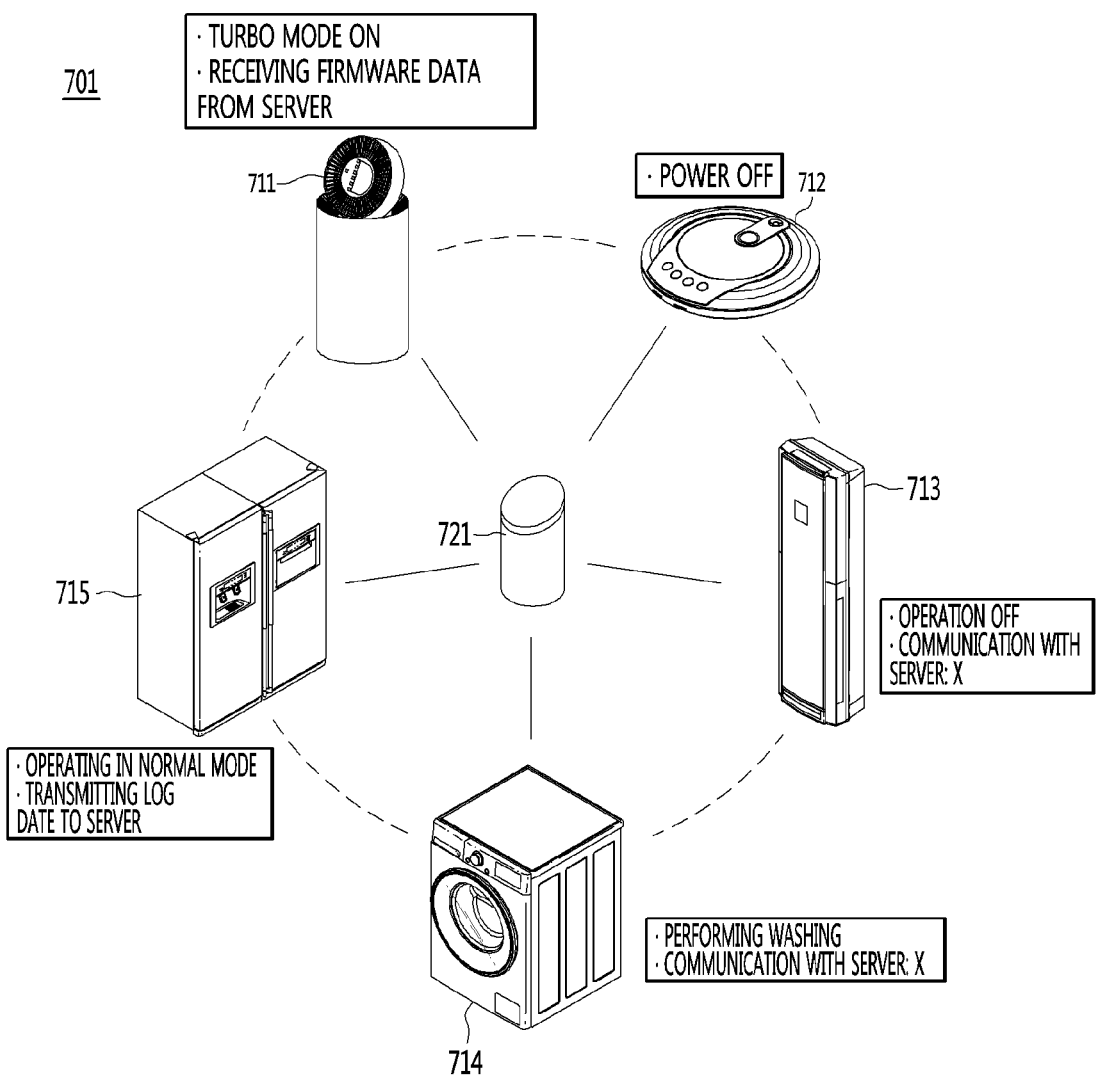
FIG. 7 is a view illustrating an example of an AI system according to an embodiment of the present invention.

FIG. 7 is a view illustrating an example of an AI system according to an embodiment of the present invention.

An AI system 701 illustrated in FIG. 7 includes one main AI apparatus 721 and five member AI apparatuses 711 to 715.

Referring to FIG. 7, the main AI apparatus 721 may be configured as an AI speaker with an AI function. Each of the member AI apparatuses 711 to 715 may be configured as an air cleaner 711, a robot cleaner 712, a clothes manager 713, a washing machine 714, a refrigerator 715, or the like having an AI function.

The main AI apparatus 721 may receive operation state information and communication state information of each of the member AI apparatuses 711 to 715 and recognize a state of each of the member AI apparatuses 711 to 715 accordingly.

That is, the main AI apparatus 721 may recognize that the air cleaner 711 is in a turbo mode and is receiving firmware data from the AI server.

Further, the main AI apparatus 721 may recognize that the robot cleaner 712 is turned off.

Further, the main AI apparatus 721 may recognize that the clothes manager 713 is not in operation (or in a standby state) and is not in communication with the AI server.

In addition, the main AI apparatus 721 may recognize that the washing machine 714 is running and is not in communication with the AI server.

Further, the main AI apparatus 721 may recognize that the refrigerator 715 is operating in a normal mode and is transmitting log data to the AI server.

Figure 8:
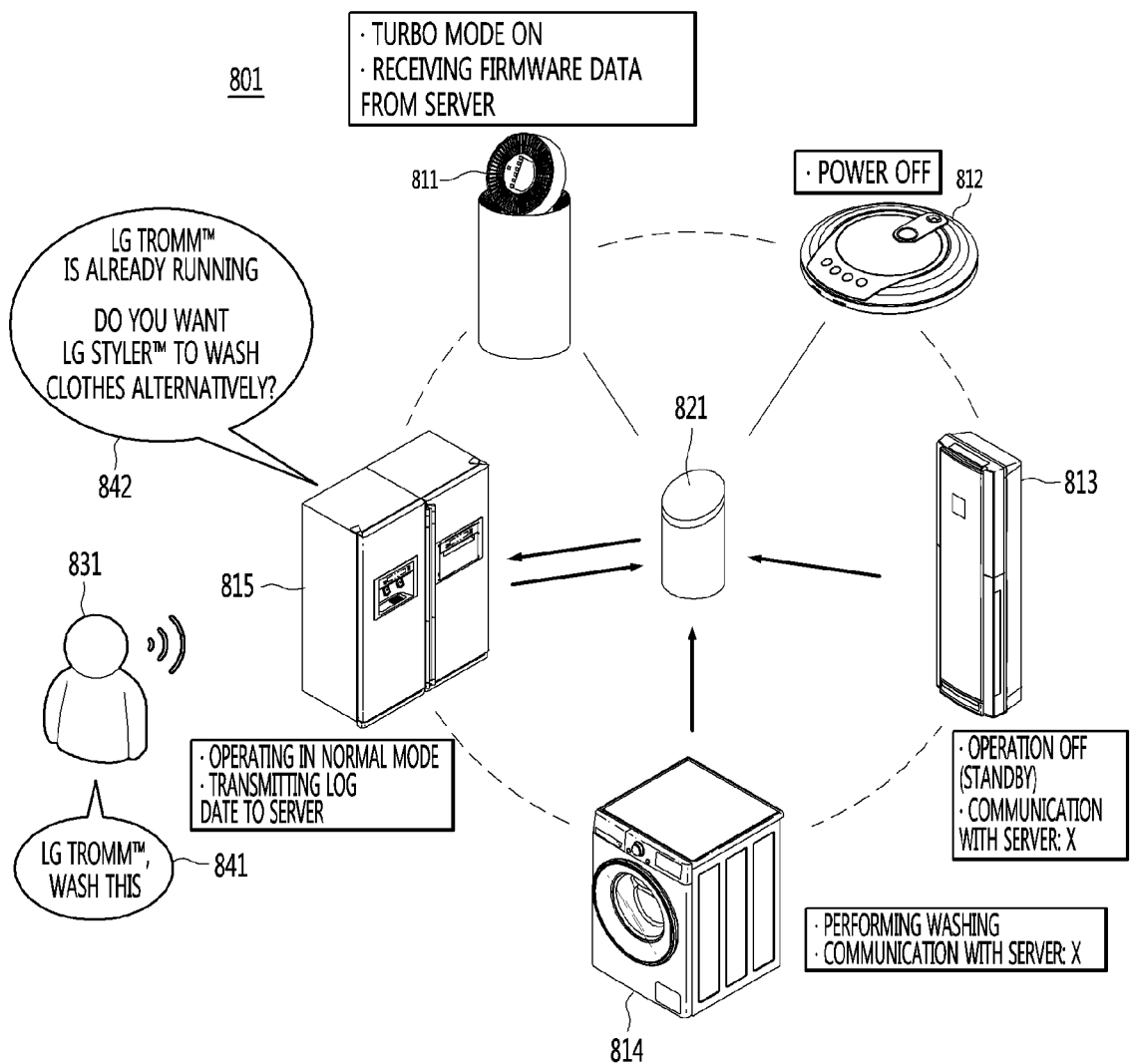
FIG. 8 is a view illustrating an example of an AI system according to an embodiment of the present invention.

FIG. 8 is a view illustrating an example of an AI system according to an embodiment of the present invention.

An AI system 801 illustrated in FIG. 8 includes one main AI apparatus 821 and five member AI apparatuses 811 to 815.

Referring to FIG. 8, the main AI apparatus 821 may be configured as an AI speaker with an AI function. Each of the member AI apparatuses 811 to 815 may be configured as an air cleaner 811, a robot cleaner 812, a clothes manager 813, a washing machine 814, a refrigerator 815, or the like having an AI function.

When a user 831 gives utterance such as "LG Tromm™, wash this" 841 near the refrigerator 815, the refrigerator 815 may generate a control command to perform washing from the utterance voice 841 of the user 831, directly or via an AI server. Then, the refrigerator 815 transmits the generated control command to the AI speaker 821, which is a main AI apparatus.

The AI speaker 821, which is the main AI apparatus, recognizes a state of each of the member AI apparatuses 811 to 815. Accordingly, the AI speaker 821 may recognize that the washing machine 814 is currently running and the clothes manager 813 is in a standby state. Then, the AI speaker 821 may recognize that the washing machine 814 is not be able to perform the control command of the user currently. Further, the AI speaker 821 may determine that the clothes manager 813 is able to perform the control command of the user instead of the washing machine 814.

In FIG. 8, the AI speaker 821 determines that the washing machine 814 is not capable of performing the control command of the user since the washing machine 815 is already running. The AI speaker 821 may also determine that the washing machine 814 is not capable of performing the control command of the user in a case in which the washing machine 814 is updating software/firmware, a case in which the washing machine 814 is in a unstable communication state, and a case in which the washing machine 814 is failed.

The AI speaker 821 may generate an output signal indicating that the refrigerator 814 is not capable of performing the control command and the control command may be performed by the clothes manager 813 alternatively and may transmit the generated output signal to the output AI apparatus. In the example of FIG. 8, the output AI apparatus is the refrigerator 815.

Then, the refrigerator 815 as the output AI apparatus may output, based on the received output signal, a voice or image message or the like such as "LG Tromm™ is already running. Do you want LG Styler™ to wash clothes alternatively?" 842.

Figure 9:
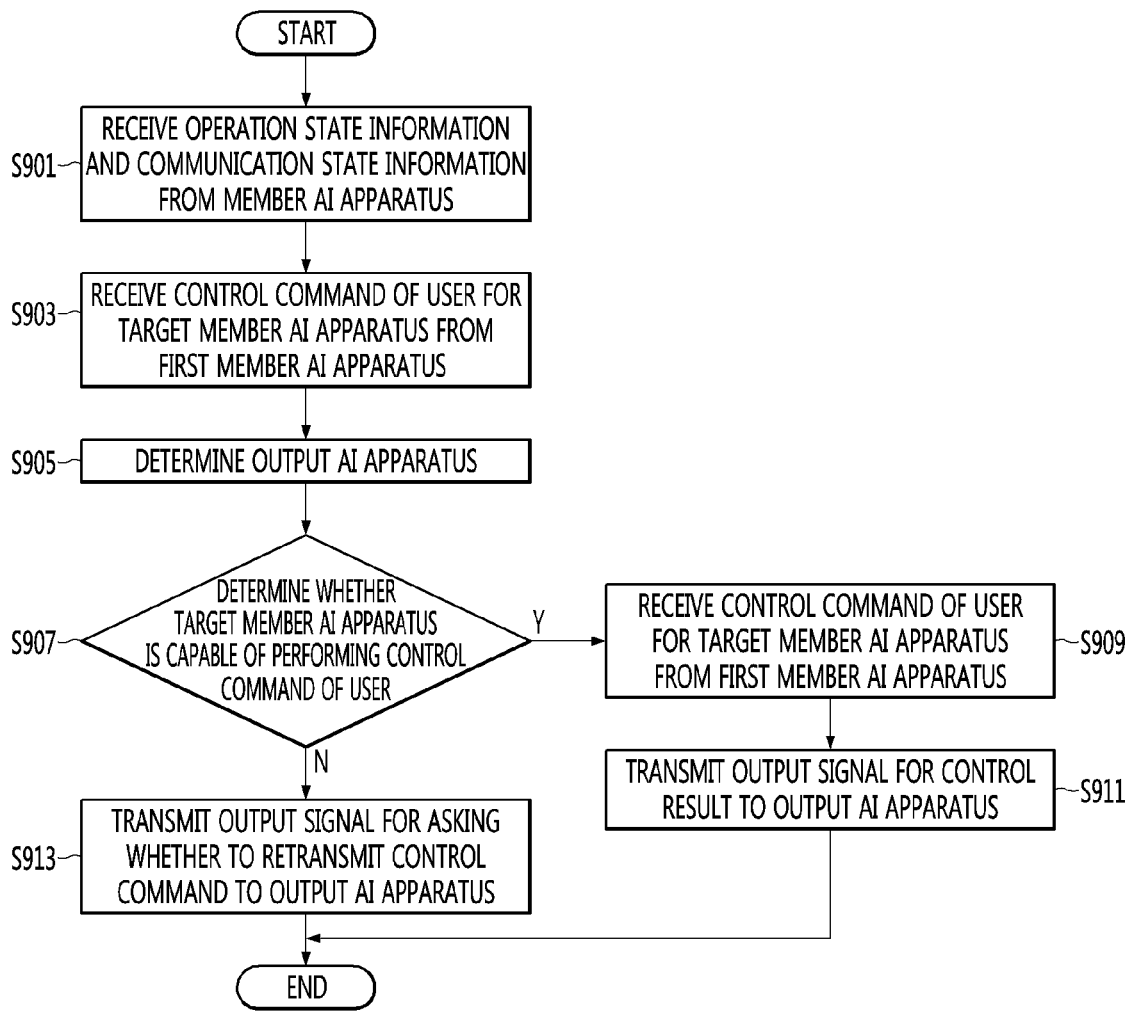
FIG. 9 is a flowchart illustrating a method for managing an operation of an AI system according to an embodiment of the present invention.

FIG. 9 is a flowchart illustrating a method for managing an operation of an AI system according to an embodiment of the present invention.

Referring to FIG. 9, the processor 180 of the main AI apparatus 100" receives the operation state information and the communication state information from the at least one member AI apparatus 100' of the same group via the communication unit 110 (S901).

Further, the main AI apparatus 100" may receive the logs from the at least one member AI apparatus 100', respectively.

Accordingly, the main AI apparatus 100" may recognize the state of each of the member AI apparatuses 100' included in the same group.

Then, the processor 180 of the main AI apparatus 100" receives the control command of the user for the target member AI apparatus from the first member AI apparatus via the communication unit 110 (S903).

Then, the processor 180 of the main AI apparatus 100" determines the output AI apparatus (S905).

The processor 180 of the main AI apparatus 100" may determine the output AI apparatus among the main AI apparatus 100" and the member AI apparatuses 100'. In other words, the main AI apparatus 100" may also be determined as the output AI apparatus.

Then, the processor 180 of the main AI apparatus 100" determines whether the target member AI apparatus may perform the control command of the user (S907).

Here, the processor 180 of the main AI apparatus 100" may determine whether the main AI apparatus 100" may communicate with the target member AI apparatus, whether the target member AI apparatus is turned on, whether the control command of the user may be performed, or the like.

When it is determined in S907 that the target member AI apparatus may perform the control command of the user, the processor 180 of the main AI apparatus 100" transmits the control command of the user to the target member AI apparatus via the communication unit 110 (S909).

When the target member AI apparatus is capable of performing the control command of the user, the control command of the user may be transmitted to the target member AI apparatus so that the target member AI apparatus may directly process the control command of the user.

Then, the processor 180 of the main AI apparatus 100" transmits, via the communication unit 110, the output signal for the result of performing the control command to the output AI apparatus (S911).

The main AI apparatus 100" may transmit the output signal for the result of performing the control command to the output AI apparatus such that the output AI apparatus may output the result of performing the control command. Further, the output AI apparatus may output the result of performing the user's control command based on the received output signal.

When it is determined in S907 that the target member AI apparatus is not capable of performing the control command of the user, the processor 180 of the main AI apparatus 100" transmits an output signal for asking whether to retransmit the control command to the output AI apparatus (S913).

The main AI apparatus 100" may transmit the output signal from the output AI apparatus to the output AI apparatus to output a message indicating that the target member AI apparatus is not capable of performing the control command of the user and asking whether to retransmit the control command at a time when the target AI apparatus is available. Further, the output AI apparatus may output, based on the received output signal, content indicating that the control command of the user is not be able to be performed and asking whether to retransmit the control command.

That is, when it is determined that the target member AI apparatus is not capable of performing the user's control command currently but may be able to perform the user's control command at a later time, the main AI apparatus 100" may transmit, to the output AI apparatus, an output signal indicating that the target member AI apparatus may be able to perform the user's control command at a later time.

Here, the output AI apparatus may output, based on the received output signal, content indicating that the target member AI apparatus is not capable of performing the user's control command currently but may be able to perform the user's control command at a later time.

Here, the output AI apparatus may output, based on the received output signal, content asking whether to retransmit the control command to the target member AI apparatus when the target member AI apparatus is able to perform the control command at a later time.

When the user responds to retransmit the control command when the target member AI apparatus is able to perform the control command, the output AI apparatus or the first member AI apparatus transmits the user's response to the main AI apparatus 100". Then, when the target member AI apparatus is able to perform the control command, the main AI apparatus 100" may transmit the corresponding control command to the target member AI apparatus.

Figure 10:
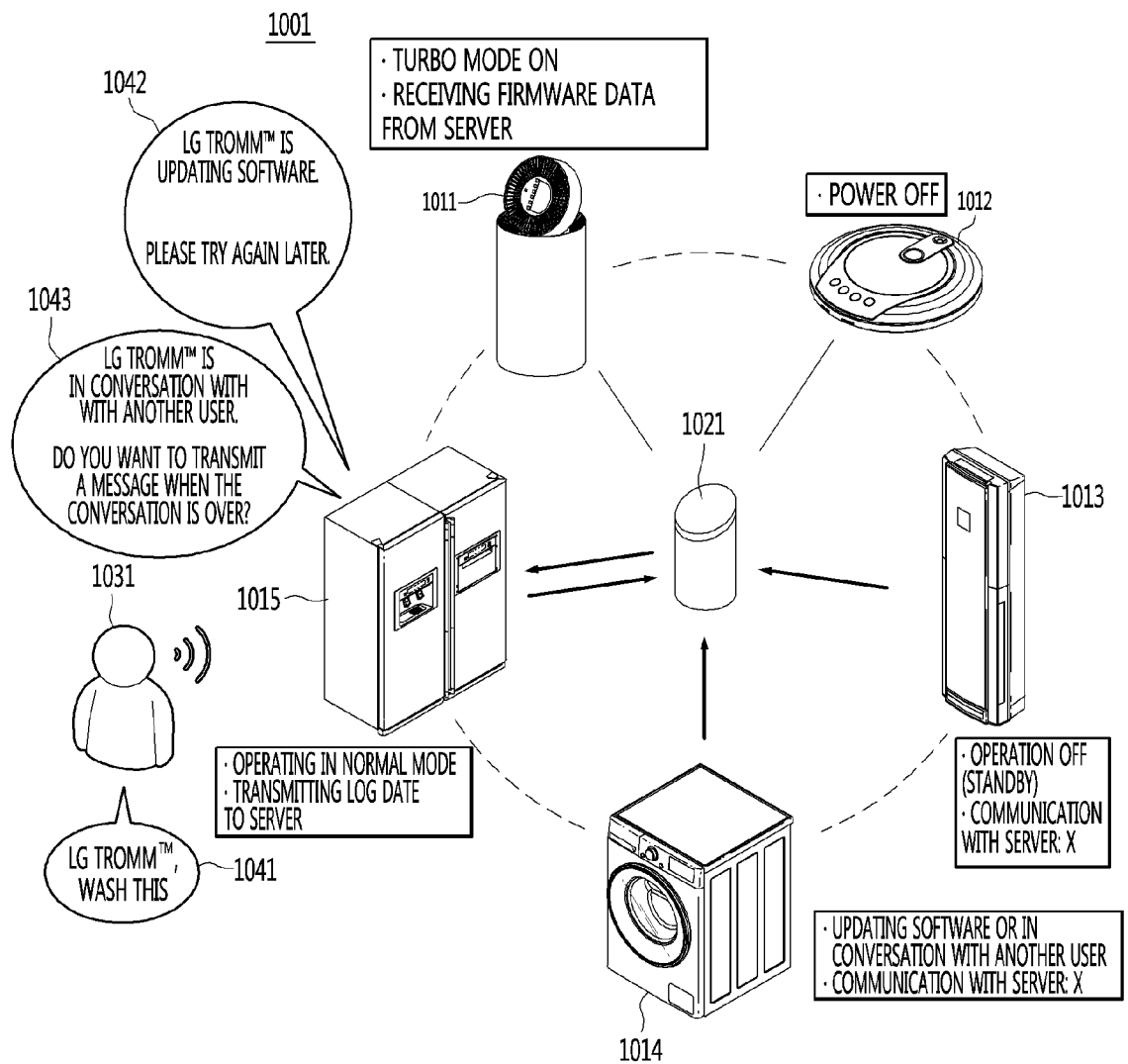
FIG. 10 is a view illustrating an example of an AI system according to an embodiment of the present invention.

FIG. 10 is a view illustrating an example of an AI system according to an embodiment of the present invention.

An AI system 1001 illustrated in FIG. 10 includes one main AI apparatus 1021 and five member AI apparatuses 1011 to 1015.

Referring to FIG. 10, the main AI apparatus 1021 may be configured as an AI speaker with an AI function. Each of the member AI apparatuses 1011 to 1015 may be configured as an air cleaner 1011, a robot cleaner 1012, a clothes manager 1013, a washing machine 1014, a refrigerator 1015, or the like having an AI function.

When a user 1031 gives utterance such as "LG Tromm™, wash this" 1041 near the refrigerator 1015, the refrigerator 1015 may generate a control command to perform washing from the utterance voice 1041 of the user 1031, directly or via an AI server. Then, the refrigerator 1015 transmits the generated control command to the AI speaker 1021, which is a main AI apparatus.

The AI speaker 1021, which is the main AI apparatus, recognizes a state of each of the member AI apparatuses 1011 to 1015. Accordingly, the AI speaker 1021 may recognize that the washing machine 814 is currently updating software or the washing machine 814 is in conversation with another user. Then, the AI speaker 1021 may recognize that the washing machine 1014 is not be able to perform the control command of the user currently.

Then, the artificial intelligence speaker 1021 may transmit an output signal generating an output indicating that the washing machine 1014 is not capable of performing the control command and requesting the user to retransmit the control command later or an output asking the user whether to transmit a user message at a time when the washing machine 1014 is capable of performing the control command of the user. In the example of FIG. 10, the output AI apparatus is the refrigerator 1015.

Then, the refrigerator 1015 as the output AI apparatus may output, based on the received output signal, a voice or image message or the like such as "LG Tromm™ is updating software. Please try again later." 1042 or "LG Tromm™ is in conversation with another user. Do you want to transmit a message when the conversation is over?" 1043.

Figure 11:
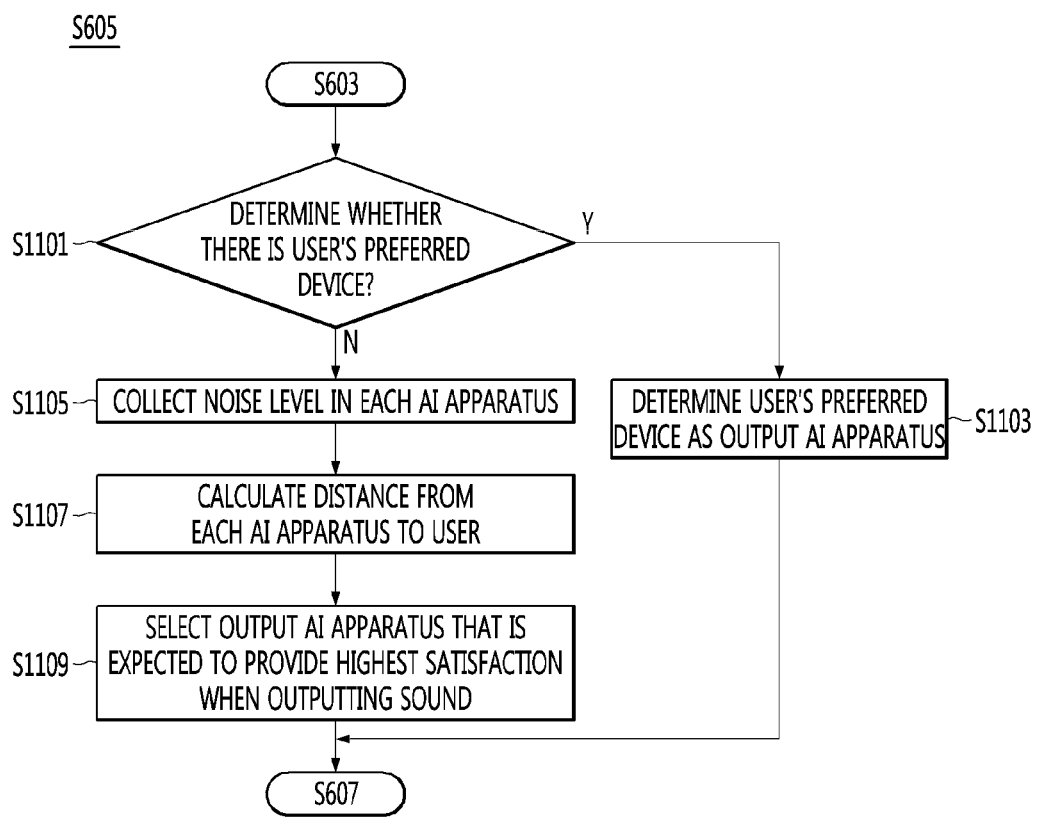
FIG. 11 is a flowchart illustrating an example of an operation S605 of determining an output AI apparatus illustrated in FIG. 6.

FIG. 11 is a flowchart illustrating an example of the operation S605 of determining the output AI apparatus illustrated in FIG. 6.

Referring to FIG. 11, the processor 180 of the main AI apparatus 100" determines whether there is a user's preferred device set by the user (S1101).

Here, the user's preferred device may mean a user's preferred output AI apparatus.

When it is determined in S1101 that there is the user's preferred output AI apparatus set by the user, the processor 180 of the main AI apparatus 100" determines the user's preferred device as the output AI apparatus (S1103).

When it is determined in S1101 that there is no user's preferred output AI apparatus set by the user, the processor 180 of the main AI apparatus 100" collects a noise level in each AI apparatus 100 (S1105).

Here, since the main AI apparatus 100" may also be included in the output AI apparatus, noise levels of not only the member AI apparatuses 100' but also of the main AI apparatus 100" may be collected, respectively.

Then, the processor 180 of the main AI apparatus 100" calculates a distance from each AI apparatus 100 to the user based on an intensity of a voice signal corresponding to a user's utterance voice collected from each AI apparatus 100 (S1107).

A location of the user may be determined, and the distance from each AI apparatus 100 to the user may be calculated accordingly using the intensity of the voice signal corresponding to the utterance voice of the user collected from each AI apparatuses 100.

Here, the processor 180 of the main AI apparatus 100" may determine the location of the user via triangulation based on the intensity of the voice signal.

Then, the processor 180 of the main AI apparatus 100" selects, as the output AI apparatus, one of the AI apparatuses 100 that is expected to provide the highest satisfaction to the user when outputting a sound (S1109).

The processor 180 of the main AI apparatus 100" may calculate user satisfaction when each AI apparatus 100 outputs a sound based on a noise level, a distance to the user, and a speaker output level of each AI apparatus 100. Then, the processor 180 may select an AI apparatus with the highest calculated user satisfaction may be selected as the output AI apparatus.

Here, the user satisfaction may be calculated in a value within a predetermined range.

For example, the user satisfaction may be determined in a real number between 0 and 1, a real number between 0 and 100, but the present invention is not limited thereto.

The speaker output level refers to an output level of a speaker mounted on each AI apparatus 100.

Here, the speaker output level may mean a maximum output value of the speaker when there is no separate volume set value, and may mean an output value of the speaker corresponding to the separate volume set value when there is the separate volume set value.

Here, the processor 180 of the main AI apparatus 100" may calculate the user satisfaction in each AI apparatus 100 using a satisfaction calculation model.

The satisfaction calculation model may mean a model that calculates the user satisfaction based on the ambient noise level, the distance to the user, and the speaker output level.

Here, the satisfaction calculation model is learned based on a machine learning algorithm or a deep learning algorithm. The satisfaction calculation model may calculate and output the user satisfaction when the ambient noise level, the distance to the user, and the speaker output level are input.

For example, the satisfaction calculation model may be a regression analysis model learned based on the machine learning algorithm. Alternatively, the satisfaction calculation model may be composed of an artificial neural network and may be learned based on the deep learning algorithm.

Training data used in the learning of the satisfaction calculation model includes the ambient noise level, the distance to the user, and the speaker output level as input features and includes labeled user satisfaction.

That is, the satisfaction calculation model may be learned based on supervised learning.

Here, the satisfaction calculation model may be learned in the learning processor 130 of the AI apparatus 100 or in the learning processor 240 of the AI server 200.

Further, the main AI apparatus 100" may store the learned satisfaction calculation model directly in the memory 170 and calculate the user satisfaction in each AI apparatus 100 using the stored satisfaction calculation model. Alternatively, the main AI apparatus 100" may calculate the user satisfaction in each AI apparatus 100 using a satisfaction calculation model stored in the memory 230 or the model storage unit 231 of the AI server 200.

The main AI apparatus 100" may collect the user satisfaction from the user's response from each AI apparatus 100 and may generate training data for updating based on collected user satisfaction.

The generated training data for updating may be used to re-train or update the satisfaction calculation model.

The user satisfaction may be obtained by explicitly asking the user for a satisfaction score and collecting a response therefor when the AI apparatus 100 provides output to the user or may be obtained by implicitly estimating satisfaction based on a user's behavior.

For example, the main AI apparatus 100" may request a response to a question, such as "Are you satisfied with the response of this device?" or "Please evaluate satisfaction.", to the user to induce the user to input satisfaction, and therefore, obtain the user satisfaction explicitly.

For example, the main AI apparatus 100" may lower the user satisfaction by a certain level when a behavior of the user that may be determined that the user is not satisfied with current output is detected, such as when the user asks again at another device (another AI apparatus), when a user's usage pattern changes, or when the user has a negative reaction.

On the other hand, the main AI apparatus 100″ may maintain the user's satisfaction or increase the user's satisfaction by over a certain level when a behavior of the user that may be determined that the user is satisfied with the current output is detected, such as when there is no behavior of the user that may be determined that the user is not satisfied with current output is detected, or when the user has a positive reaction.

Here, only one satisfaction calculation model that manages all the AI apparatuses 100 may be learned or a satisfaction calculation model may be learned for each AI apparatus 100.

In particular, when user satisfaction of a particular AI apparatus 100 is determined to be consistently high, the main AI apparatus 100″ may generate an output signal asking the user whether to set the corresponding AI apparatus 100 as the user's preferred device and provide the output signal via the corresponding AI apparatus 100.

FIG. 12 is a table illustrating an example of training data used in learning of a satisfaction calculation model according to an embodiment of the present invention.

Referring to FIG. 12, the training data used in the learning of the satisfaction calculation model includes the ambient noise, the distance to the user, and the speaker output level as the input features and includes the labeled user satisfaction.

Each training data may be composed of (the ambient noise level, the distance to user, the speaker output level, the labeled user satisfaction).

For example, training data 1 may be composed of (10, 10, 30, 80), training data 2 may be composed of (5, 5, 30, 100), training data 3 may be (20, 5, 30, 75), and training data 4 may be composed of (15, 15, 30, 50). More training data in addition to the training data 1 to 4 may be used to train the satisfaction calculation model.

Further, in the above example, when a noise level, a distance to the user, a speaker output level collected by a particular AI apparatus 100 are respectively 12 dB, 13 m, and 30 dB, the satisfaction calculation model may calculate a user satisfaction to be 76.5 when a sound is output from the corresponding AI apparatus 100.

Figure 13:
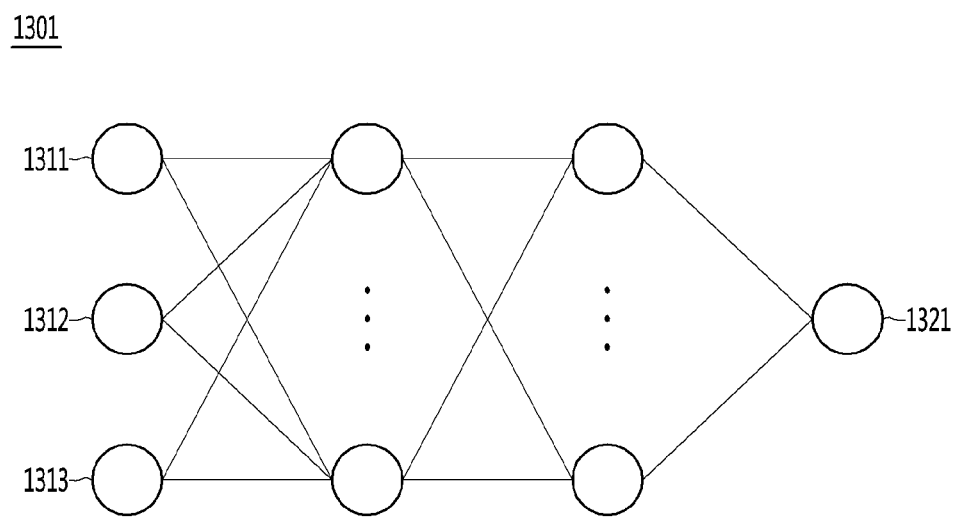
FIG. 13 is a view illustrating an example of a satisfaction calculation model according to an embodiment of the present invention.

FIG. 13 is a view illustrating an example of a satisfaction calculation model 1301 according to an embodiment of the present invention.

Referring to FIG. 13, the satisfaction calculation model 1301 according to an embodiment of the present invention may be composed of an artificial neural network.

Further, input features or input feature vectors may include an ambient noise level, a distance to the user, a speaker output level. That is, the ambient noise level may be input to a first input node 1311, the distance to the user may be input to a second input node 1312, and the speaker output level may be input to a third input node 1313.

Here, an order of the input nodes 1311, 1312, and 1313 may be changed.

Further, an output feature or an output feature vector may include user satisfaction.

That is, the user satisfaction may be output from an output node 1321.

A structure of the artificial neural network illustrated in FIG. 13 is merely an example, the number of hidden layers, the number of nodes in each hidden layer, and a connection between the nodes may be changed variously.

According to an embodiment of the present invention, the above-described method may be implemented as a processor-readable code in a medium where a program is recorded. Examples of a processor-readable medium may include read-only memory (ROM), random access memory (RAM), CD-ROM, a magnetic tape, a floppy disk, and an optical data storage device.

What is claimed is:

1. An artificial intelligence (AI) apparatus for managing an operation of an artificial intelligence (AI) system, the AI apparatus comprising:
   a communication unit configured to receive state information from at least one member AI apparatus included in the AI system, respectively;
   a memory configured to store apparatus information on the at least one member AI apparatus, respectively; and
   a processor configured to:
      upon acquiring a control command of a user, determine a target member AI apparatus to perform the control command;
      determine whether the target member AI apparatus is capable of performing the control command or not;
      transmit the control command to the target member AI apparatus if the target member AI apparatus is capable of performing the control command; and
      output a response indicating that the target member AI apparatus is not capable of performing the control command if the target member AI apparatus is not capable of performing the control command,
   wherein the processor is configured to:
   determine an output AI apparatus having a highest user satisfaction among the at least one member AI apparatus and the AI apparatus if the control command is acquired; and
   output the response via the output AI apparatus,
   wherein the user satisfaction is calculated by using a satisfaction calculation model when each of the at least one member AI apparatus and the AI apparatus outputs the response as a sound, and
   wherein the satisfaction calculation model is configured to, when an ambient noise level, a distance to the user, and a speaker output level of each of the at least one member AI apparatus and the AI apparatus are input, calculate user satisfaction in each of the at least one member AI apparatus and the AI apparatus.

2. The AI apparatus of claim 1, wherein the processor is configured to determine the target member AI apparatus based on at least one of the control command or the apparatus information.

3. The AI apparatus of claim 2, wherein the processor is configured to determine whether the target member AI apparatus is capable of performing the control command based on the state information, and
   wherein the state information includes at least one of operation state information or communication state information for the at least one member AI apparatuses, respectively.

4. The AI apparatus of claim 3, wherein the processor is configured to determine whether the target member AI apparatus is capable of performing the control command based on at least one of a power supply state, an operation state, a software update state, a data transmission state, or a network state of the target member AI apparatus.

5. The AI apparatus of claim 4, wherein the processor is configured to:
   determine whether there is an alternative member AI apparatus capable of performing the control command instead of the target member AI apparatus among the at least one member AI apparatus if the target member AI apparatus is not capable of performing the control command; and output a response inquiring whether to perform the control command by the alternative member AI apparatus instead of the target member AI apparatus if there is the alternative member AI apparatus.

6. The AI apparatus of claim 4, wherein the processor is configured to output a response inquiring whether to retransmit the control command to the target member AI apparatus if the target member AI apparatus is not capable of performing the control command.

7. The AI apparatus of claim 6, wherein the processor is configured to transmit the control command to the target member AI apparatus when a time at which the target member AI apparatus is capable of performing the control command comes, if the user responds to retransmit the control command.

8. The AI apparatus of claim 1, wherein the satisfaction calculation model is a model learned by using a supervised-learning based on a machine learning algorithm or a deep-learning algorithm using training data, and
wherein the training data includes the ambient noise level, the distance to the user, the speaker output level, and a labeled user satisfaction of each of the at least one member AI apparatus and the AI apparatus.

9. A method for managing an operation of an artificial intelligence (AI) system, the method comprising:
receiving state information from at least one member AI apparatus included in the AI system, respectively;
determining a target member AI apparatus to perform the control command upon acquiring a control command of a user;
determining whether the target member AI apparatus is capable of performing the control command or not;
transmitting the control command to the target member AI apparatus if the target member AI apparatus is capable of performing the control command; and
outputting a response indicating that the target member AI apparatus is not capable of performing the control command if the target member AI apparatus is not capable of performing the control command,
wherein the method further comprises:
determining an output AI apparatus having a highest user satisfaction among the at least one member AI apparatus and the AI apparatus if the control command is acquired; and
outputting the response via the output AI apparatus,
wherein the user satisfaction is calculated by using a satisfaction calculation model when each of the at least one member AI apparatus and the AI apparatus outputs the response as a sound, and
wherein the satisfaction calculation model is configured to, when an ambient noise level, a distance to the user, and a speaker output level of each of the at least one member AI apparatus and the AI apparatus are input, calculate user satisfaction in each of the at least one member AI apparatus and the AI apparatus.

10. A storage medium having a program stored on a non-transitory computer-readable medium, wherein the program is configured for performing a method for managing an operation of an artificial intelligence (AI) system, the method including:
receiving state information from at least one member AI apparatus included in the AI system, respectively;
determining a target member AI apparatus to perform the control command upon acquiring a control command of a user;
determining whether the target member AI apparatus is capable of performing the control command or not;
transmitting the control command to the target member AI apparatus if the target member AI apparatus is capable of performing the control command; and
outputting a response indicating that the target member AI apparatus is not capable of performing the control command if the target member AI apparatus is not capable of performing the control command,
wherein the method further includes:
determining an output AI apparatus having a highest user satisfaction among the at least one member AI apparatus and the AI apparatus if the control command is acquired; and
outputting the response via the output AI apparatus,
wherein the user satisfaction is calculated by using a satisfaction calculation model when each of the at least one member AI apparatus and the AI apparatus outputs the response as a sound, and
wherein the satisfaction calculation model is configured to, when an ambient noise level, a distance to the user, and a speaker output level of each of the at least one member AI apparatus and the AI apparatus are input, calculate user satisfaction in each of the at least one member AI apparatus and the AI apparatus.

* * * * *